(12) United States Patent
Seong et al.

(10) Patent No.: US 12,546,829 B2
(45) Date of Patent: Feb. 10, 2026

(54) ALL-SOLID-STATE BATTERY ANALYSIS SYSTEM AND METHOD OF USING THE SAME

(71) Applicants: Hyundai Motor Company, Seoul (KR); Kia Corporation, Seoul (KR); Institute for Research & Industry Cooperation Pusan National University, Busan (KR)

(72) Inventors: Ju Yeong Seong, Gyeonggi-do (KR); Im Sul Seo, Chungcheongbuk-do (KR); Jeong Hyun Seo, Dajeon (KR); Je Sik Park, Seoul (KR); Sung Woo Noh, Seoul (KR); Sang Heon Lee, Gyeonggi-do (KR); Chung Bum Lim, Gyeonggi-do (KR); Hye Won Kim, Gyeongsangbuk-do (KR); Jae Young Hong, Busan (KR); So Young Joo, Busan (KR); Yu Jeong Min, Busan (KR); Ji Ung Jeong, Busan (KR); Heon Cheol Shin, Busan (KR)

(73) Assignees: Hyundai Motor Company, Seoul (KR); Kia Corporation, Seoul (KR); Institute for Research & Industry Cooperation Pusan National University, Busan (KR)

( * ) Notice: Subject to any disclaimer, the term of this patent is extended or adjusted under 35 U.S.C. 154(b) by 460 days.

(21) Appl. No.: 17/985,868

(22) Filed: Nov. 13, 2022

(65) Prior Publication Data

US 2023/0176133 A1 Jun. 8, 2023

(30) Foreign Application Priority Data

Dec. 6, 2021 (KR) .......................... 10-2021-0173022

(51) Int. Cl.
*G01R 31/382* (2019.01)
*H01M 10/0562* (2010.01)
(Continued)

(52) U.S. Cl.
CPC ...... *G01R 31/382* (2019.01); *H01M 10/4285* (2013.01); *H01M 10/44* (2013.01); *H01M 10/0562* (2013.01)

(58) Field of Classification Search
CPC ........................ G01R 31/382; H01M 10/4285; H01M 10/44; H01M 10/0562
See application file for complete search history.

(56) References Cited

U.S. PATENT DOCUMENTS

2022/0115707 A1* 4/2022 Seong ................ H01M 4/0433
2025/0079495 A1* 3/2025 Sawase ............. H01M 10/0562

FOREIGN PATENT DOCUMENTS

KR 101530812 B1 6/2015
KR 10-2022-0048096 A 4/2022

OTHER PUBLICATIONS

Kisu, K. at al., "Internal Resistance Mapping Preparation to Optimize Electrode Thickness and Density Using Symmetric Cell for High Performance Lithium Ion Batteries and Capacitors", Journal of Power Sources, 396 (2018) 207-212.
(Continued)

*Primary Examiner* — Stephanie E Bloss
*Assistant Examiner* — Michael A Harrison
(74) *Attorney, Agent, or Firm* — Fox Rothschild LLP

(57) ABSTRACT

The present disclosure relates to an all-solid-state battery analysis system capable of reliably obtaining an electrochemical signal according to the degree of charge of an electrode, and an all-solid-state battery analysis method using the same. The system may include a body member, of cylindrical shape, having a first cavity extending there-
(Continued)

through in a vertical direction and a second cavity extending therethrough in a horizontal direction and communicating with the first cavity. The system may include a first conductive member including a first base having a plate shape and a first protrusion protruding from the first base having a shape corresponding to a shape of the first cavity; and a second conductive member including a second base having a plate shape and a second protrusion protruding from the second base and having a shape corresponding to the shape of the first cavity.

11 Claims, 15 Drawing Sheets

(51) Int. Cl.
*H01M 10/42* (2006.01)
*H01M 10/44* (2006.01)

(56) References Cited

OTHER PUBLICATIONS

Portalis, G et al., "Electrochemical Impedance Spectroscopy Investigation on Battery Materials Using a Symmetrical Cell", Journal of Solid State Electrochemistry (2021) 25:1915-1926.
Chen, C.H. et al., "Symmetric Cell Approach and Impedance Spectroscopy of High Power Lithium Ion Batteries", Journal of Power Sources, 96 (2001) 321-328.
Ikezawa, Atsunori, et al. "Performance of Li4Ti5O12-based reference electrode for the electrochemical analysis of all- solid-state lithium-ion batteries." Electrochemistry Communications 116 (2020): 106743.

* cited by examiner

ALL-SOLID-STATE BATTERY ANALYSIS SYSTEM AND METHOD OF USING THE SAME

CROSS REFERENCE TO RELATED APPLICATION

The present application claims under 35 U.S.C. § 119(a) the benefit of and priority to Korean Patent Application No. 10-2021-0173022, filed Dec. 6, 2021, the entire contents of which is incorporated herein for all purposes by this reference.

BACKGROUND OF THE DISCLOSURE

1. Technical Field

The present disclosure relates to an all-solid-state battery analysis system capable of reliably obtaining an electrochemical signal changing with the state of charge (SOC) of an electrode, and an all-solid-state battery analysis method using the same.

2. Background

It is well known that lithium-ion batteries have the best performance among existing secondary batteries. However, lithium-ion batteries structurally have a risk of ignition and explosion. Oxygen is contained in the cathode active material, and the liquid electrolyte acts as a fuel at high temperatures. These may lead to the liquid electrolyte catching fire.

Specifically, when events such as dendritic lithium dendrite formation, separator defect, overcharging, or impact to battery cells occur, a large current flows, which causes the separator to melt and the anode to be exposed, and the battery temperature to rises, leading to decomposition of a cathode material and release of oxygen. Eventually, oxygen, heat, and fuel meet, resulting in that the liquid electrolyte is combusted.

Accordingly, research on next-generation batteries with higher energy density and stability than lithium-ion batteries is being actively conducted.

The next-generation battery may be an all-solid-state battery. An all-solid-state battery is a battery in which the electrolyte is a solid. That is, all materials in an all-solid-state battery are solid.

The all-solid-state battery has excellent stability because it uses a solid electrolyte that does not evaporate when there is change in temperature and which has no risk of leaking when there is external shock. In addition, the all-solid-state battery does not experience swelling and can operate normally even in an extreme external environment with high temperature and pressure.

In addition, the output of the battery can be significantly increased compared to conventional batteries. Unlike lithium ion batteries using a liquid electrolyte, a solvent desolvation reaction in which lithium ions are separated from a solvent during charging and discharging does not occur in all-solid-state batteries. The charging and discharging reactions directly lead to the diffusion reaction of lithium ions in the solid, thereby enabling high output.

The all-solid-state battery also has the advantage that the operating temperature range is broad. The all-solid-state battery can secure stable performance in a wide temperature range compared to conventional liquid-electrolyte batteries. In particular, high ionic conductivity is expected at low temperatures. One of the problems of electric vehicles is that in winter, the performance of the battery deteriorates and the mileage decreases. When the era of all-solid-state batteries arrives, the problem that occurs with conventional liquid-electrolyte batteries in the low-temperature environment will be resolved.

On the other hand, battery performance related to the advantages of all-solid-state batteries can be evaluated on the basis of various items such as charge/discharge capacity, charge/discharge characteristics, high-temperature discharge characteristics, low-temperature discharge characteristics, stability, and lifespan. However, there have been no standards for battery performance evaluation.

Predictably, all-solid-state batteries may be determined to be defective either during use or immediately after fabrication. Without determining the cause of the defect, the occurrence of defective products cannot be suppressed.

A currently available method of detecting defective products is to sort out batteries having any defect such as insufficient capacity or a short circuit through X-ray inspection or the like. For this, it is important to more accurately measure and analyze the loading of an electrode active material and characteristics such as electrochemical reaction.

Korean Patent No. 10-1530812 relates to a method of separating the interfacial resistance of a cathode and an anode of an all-solid-state battery by using a reference electrode. In addition, Korean Patent Application Publication No. 10-2020-0130842 applied by the same applicant relates to a method of reliably analyzing an electrochemical signal without disassembling an all-solid-state battery. In the above patent applications, structural distortion occurs because the reference electrode in the form of a wire is inserted, and the electrochemical signal may be affected by the state (for example, contamination) of the reference electrode.

A typical symmetrical cell is manufactured by adjusting the state of charge (SOC) through charging and discharging of two unit cells and then disassembling the cells. However, in the case of an all-solid-state battery, all components thereof are in a compressed state. Therefore, it is difficult to disassemble the battery and thus it is difficult to manufacture a symmetrical cell having a specific state of charge (SOC).

J. Power Sources 396 (2018) 207-212 is a study report of symmetrical cells with a controlled state of charge (SOC) in lithium-ion batteries containing liquid electrolytes. The technique described in the study has problems that the electrolyte can be contaminated by repeated removals and insertions of lithium metal, it is difficult to construct the same internal structures, and it cannot be applied to all-solid-state batteries which are difficult to disassemble.

J. Solid State Electrochem. 25 (2021) 1915-1926 relates to a lithium-ion battery symmetric cell technology that can control the state of charge (SOC) in a state in which lithium metal is inserted in the cell. The study was performed on a battery in which the shape of the working electrode was changed to a ring shape which is different from the electrode in an actual battery, which may affect the electrochemical signal. In addition, due to the cell structure, the contact between the working electrode and the current collector connected to the working electrode may act as a resistor, and a coating for reducing the contact resistance may also affect the impedance signal.

SUMMARY OF THE DISCLOSURE

One objective of the present disclosure is to provide an all-solid-state battery analysis system capable of stably obtaining an electrochemical signal according to the state of charge (SOC) of an electrode, and an all-solid-state battery analysis method using the same.

However, the objectives of the present disclosure are not limited to the one described above. The objectives of the present disclosure will become more apparent from the following description and will be realized with components recited in the claims and combinations of the components.

An all-solid-state battery analysis system according to one embodiment of the present disclosure includes: a cylindrical body member having a first cavity extending therethrough in a vertical direction and a second cavity extending therethrough in a horizontal direction and communicating with the first cavity; a first conductive member including a plate-shaped first base and a first protrusion protruding from the first base and having a shape corresponding to a shape of the first cavity; and a second conductive member including a plate-shaped second base and a second protrusion protruding from the second base and having a shape corresponding to the shape of the first cavity. In addition, the first conductive member may be configured such that the first protrusion is configured to be inserted into the first cavity from above the body member and the second conductive member may be configured such that the second protrusion is configured to be inserted into the first cavity from below the body member. A gap between the first protrusion and the second protrusion in the first cavity may be configured to receive an all-solid-state battery therein. The all-solid-state battery may include a first electrode layer in contact with the first protrusion, a second electrode layer in contact with the second protrusion, a solid electrolyte layer positioned between the first electrode layer and the second electrode layer, and an SOC control unit having a first end disposed in the solid electrolyte layer and a second end exposed to an outside environment through the second cavity.

The body member may further include an insulating portion disposed on an inner wall of the first cavity and an inner wall of the second cavity.

The solid electrolyte layer may include a first solid electrolyte layer adjacent to the first electrode layer and a second solid electrolyte adjacent closer to the second electrode layer, and the SOC control unit may include a flat plate portion having a predetermined area and being disposed between the first solid electrolyte layer and the second solid electrolyte layer and an extension having a first end connected to the flat plate portion and a second end that is exposed via the second cavity.

The flat plate portion may have a smaller area than that of the solid electrolyte layer such that the first solid electrolyte layer and the second solid electrolyte layer are in contact with each other over an edge of the flat plate portion.

The SOC control unit may include a metal mesh or metal foam made of at least one metallic material selected from the group consisting of tungsten (W), aluminum (Al), nickel (Ni), stainless steel (SUS), and combinations thereof.

Since the SOC control unit is porous, the first solid electrolyte layer and the second solid electrolyte layer may contact each other through pores inside the flat plate portion in addition to the edge of the flat plate portion.

The SOC control unit may be coated with at least one noble metal selected from the group consisting of gold (Au), silver (Ag), platinum (Pt), and combinations thereof.

The SOC control unit may be pre-lithiated.

An all-solid-state battery analysis method according to one embodiment of the present disclosure includes: a first step of imparting the polarity of a cathode to a first electrode layer and the polarity of an anode to an SOC control unit; a second step of applying a predetermined oxidation current to an all-solid-state battery for a predetermined period of time; a third step of imparting the polarity of the cathode to the second electrode layer and the polarity of the anode to the SOC control unit; and a fourth step of applying the same oxidation current as in the second step to the all-solid-state battery for the same period of time as in the second step. Additionally, the all-solid-state battery may include a symmetric cell in which the first electrode layer includes a cathode active material and the second electrode layer includes a cathode active material.

An all-solid-state battery according to one embodiment of the present disclosure includes: a first step of imparting the polarity of a cathode to a first electrode layer and the polarity of an anode to an SOC control unit; a second step of applying a predetermined oxidation current to an all-solid-state battery for a predetermined period of time; a third step of imparting the polarity of the cathode to a second electrode layer and the polarity of the anode to the first electrode layer; a fourth step of applying the same oxidation current as in the second step to the all-solid-state battery for the same period of time as in the second step; a fifth step of imparting the polarity of the cathode to the first electrode layer and the polarity of the anode to the second electrode layer; a sixth step of applying the same oxidation current as in the fourth step to the all-solid-state battery for half the period of time of the fourth step; a seventh step of imparting the polarity of the cathode to the first electrode layer and the polarity of the anode to the second electrode layer; and an eighth step of applying the same oxidation current as in the sixth step to the all-solid-state battery for the same period of time as in the sixth step, in which after the eighth step, the third through eighth steps are repeated a plurality of times until the all-solid-state battery reaches a target SOC. Additionally, the all-solid-state battery may include a symmetric cell in which the first electrode layer includes a cathode active material and the second electrode layer includes a cathode active material.

An all-solid-state battery analysis method according to one embodiment of the present disclosure includes: a first step of imparting the polarity of a cathode to a first electrode layer and the polarity of an anode to an SOC control unit; a second step of applying a predetermined reduction current to an all-solid-state battery for a predetermined period of time; a third step of imparting the polarity of the cathode to the second electrode layer and the polarity of the anode to the SOC control unit; and a fourth step of applying the same reduction current as in the second step to the all-solid-state battery for the same period of time as in the second step. Additionally, the all-solid-state battery may include a symmetric cell in which the first electrode layer includes an anode active material and the second electrode layer includes an anode active material.

An all-solid-state battery analysis method according to one embodiment of the present disclosure includes: a first step of imparting the polarity of a cathode to a first electrode layer and the polarity of an anode to an SOC control unit; a second step of applying a predetermined reduction current to an all-solid-state battery for a predetermined period of time; a third step of imparting the polarity of the cathode to the second electrode layer and the polarity of the anode to the first electrode layer; a fourth step of applying the same reduction current as in the second step to the all-solid-state battery for the same period of time as in the second step; a fifth step of imparting the polarity of the cathode to the first electrode layer and the polarity of the anode to the second electrode layer; a sixth step of applying the same reduction current as in the fourth step to the all-solid-state battery for half the period of time of the fourth step; a seventh step of imparting the polarity of the cathode to the first electrode layer and the polarity of the anode to the second electrode layer; and an eighth step of applying the same reduction current as in the sixth step to the all-solid-state battery for the same period of time as in the sixth step, in which after the eighth step, the third through eighth steps are repeated a plurality of times until the all-solid-state battery reaches a target SOC. Additionally, the all-solid-state battery may include a symmetric cell in which the first electrode layer includes an anode active material and the second electrode layer includes an anode active material.

The all-solid-state battery analysis system and method according to the present disclosure can stably obtain an electrochemical signal according to the SOC of each electrode.

However, the advantages of the present disclosure are not limited thereto. It should be understood that the advantages of the present disclosure include all effects that can be inferred from the description given below.

DESCRIPTION OF THE PREFERRED EMBODIMENTS

Figure 1:
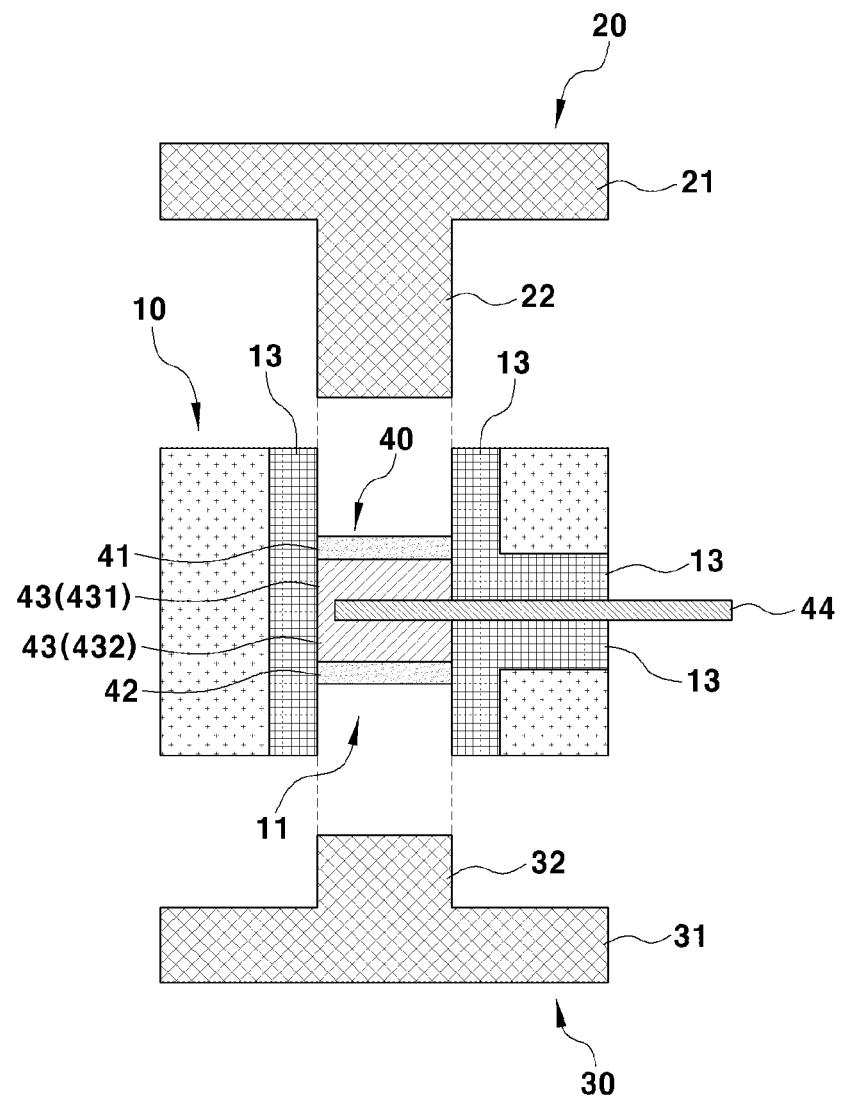
FIG. 1 is an exploded view of an all-solid-state battery according to one embodiment of the present disclosure.

Above objectives, other objectives, features, and advantages of the present disclosure will be readily understood from the following preferred embodiments associated with the accompanying drawings. However, the present disclosure is not limited to the embodiments described herein and may be embodied in other forms. The embodiments described herein are provided so that the disclosure can be made thorough and complete and that the spirit of the present disclosure can be fully conveyed to those skilled in the art.

Throughout the drawings, like elements are denoted by like reference numerals. In the accompanying drawings, the dimensions of the structures are larger than actual sizes for clarity of the present disclosure. Terms used in the specification, "first", "second", etc., may be used to describe various components, but the components are not to be construed as being limited to the terms. These terms are used only for the purpose of distinguishing a component from another component. For example, a first component may be referred as a second component, and the second component may be also referred to as the first component. As used herein, the singular forms "a", "an", and "the" are intended to include the plural forms as well unless the context clearly indicates otherwise.

It will be further understood that the terms "comprises", "includes", or "has" when used in this specification specify the presence of stated features, regions, integers, steps, operations, elements and/or components, but do not preclude the presence or addition of one or more other features, regions, integers, steps, operations, elements, components and/or combinations thereof. It will also be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

Figure 2:
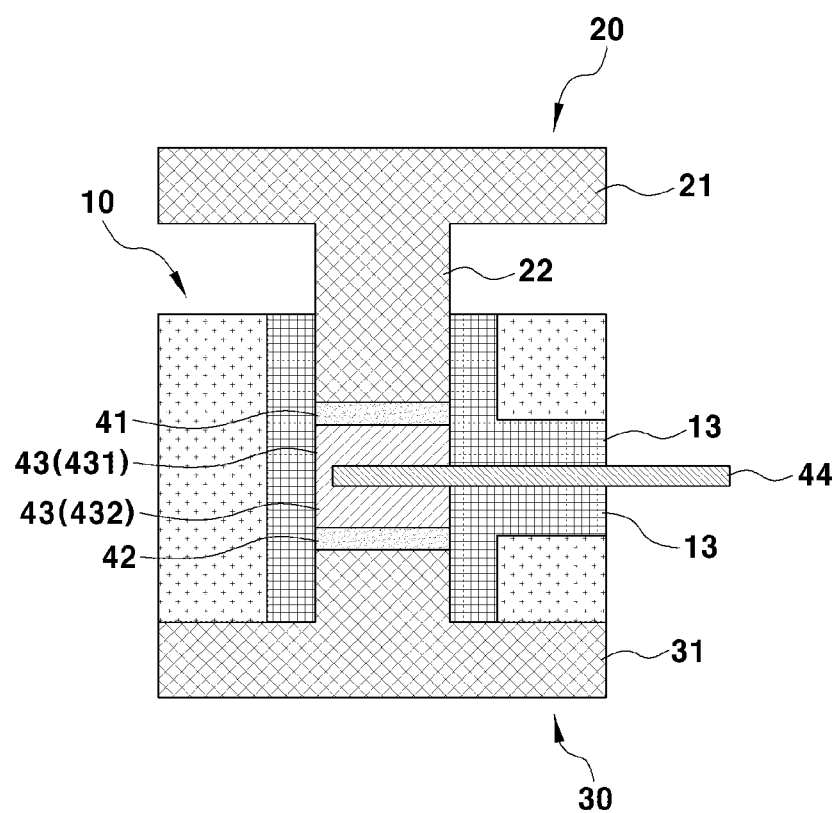
FIG. 2 is a cross-sectional view of an all-solid-state battery analysis system according to one embodiment of the present disclosure.

FIG. 1 is an exploded view of an all-solid-state battery according to one embodiment of the present disclosure. FIG. 2 is a cross-sectional view of an all-solid-state battery analysis system according to one embodiment of the present disclosure. Referring to FIGS. 1 and 2, the system includes a body member 10, a first conductive member 20 positioned on the body member 10, a second conductive member 30 positioned under the body member 10, and an all-solid-state battery 40 accommodated in the body member 10. Here, the orientations such as the upper part, the lower part, etc. of the body member 10 are described based on the directions shown in FIGS. 1 and 2 for convenience of description. However, the position of each component is not limited thereto.

Figure 3:
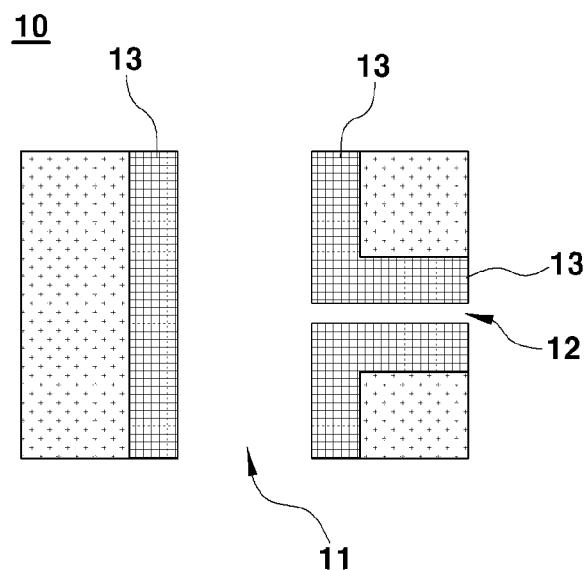
FIG. 3 is a cross-sectional view illustrating a body member.

FIG. 3 is a cross-sectional view illustrating the body member 10. Referring to FIG. 3, the body member 10 has a cylindrical shape. The body member 10 has a first cavity 11 extending through from top to bottom (in the vertical direction) and a second cavity formed to communicate with the first cavity 11 and extending through from side to side (in the horizontal direction).

The body member 10 may include an insulating portion 13 positioned on the inner wall of the first cavity 11 and the inner wall of the second cavity 12. The insulating portion 13 is a component to prevent the first conductive member 20, the second conductive member 30, and the all-solid-state battery 40 accommodated in the body member 10 from being short-circuited due to electric conduction through the body member 10. Alternatively, the insulating portion 13 may be eliminated when the body member 10 may be made of an insulating material.

The first conductive member 20 includes a plate-shaped first base 21 and a first protrusion 22 protruding from the first base 21 in a shape corresponding to the shape of the first cavity 11.

The first base 21 serves as a stopper when the first conductive member 20 is coupled to the body member 10. The first base 21 may be a plate-shaped structure having an area larger than the area of the first cavity 11.

The first conductive member 20 is installed in a manner that the first protrusion 22 is inserted into the first cavity 11 from above the body member 10.

The first conductive member 20 is in direct contact with a first electrode layer 41 of the all-solid-state battery 40, which will be described later. The first conductive member 20 serves to collect current and imparts a polarity to the first electrode layer 41.

The second conductive member 30 includes a plate-shaped second base 31 and a second protrusion 32 protruding from the second base 31 in a shape corresponding to the shape of the first cavity 11.

The second base 31 serves as a stopper when the second conductive member 30 is coupled to the body member 10. The second base 31 may be a plate-shaped structure having an area larger than the area of the first cavity 11.

The second conductive member 30 is installed in a manner that the second protrusion 32 is inserted into the first cavity 11 from above the body member 10.

The second conductive member 30 is in direct contact with a second electrode layer 42 of the all-solid-state battery 40, which will be described later. The second conductive member 30 serves to collect current and imparts a polarity to the second electrode layer 42.

The all-solid-state battery 40 includes the first electrode layer 41, the second electrode layer 42, a solid electrolyte layer 43 positioned between the first electrode layer 41 and the second electrode layer 42, and a state-of-charge (SOC) control unit 44 disposed in the solid electrolyte layer 43.

The all-solid-state battery 40 may be a symmetrical cell. That is, each of the first electrode layer 41 and the second electrode layer 42 may be an electrode including a cathode active material.

The cathode active material is not particularly limited, but may be, for example, an oxide active material or a sulfide active material.

The oxide active material is a rock salt layer-type active material such as $LiCoO_2$, $LiMnO_2$, $LiNiO_2$, $LiVO_2$, $Li_{1+x}Ni_{1/3}Co_{1/3}Mn_{1/3}O_2$, etc., a spinel-type active material such as $LiMn_2O_4$, $Li(Ni_{0.5}Mn_{1.5})O_4$, etc., an inverse spinel-type active material such as $LiNiVO_4$, $LiCoVO_4$, etc., an olivine-type active material such as $LiFePO_4$, $LiMnPO_4$, $LiCoPO_4$, $LiNiPO_4$, etc., a silicon-containing active material such as $Li_2FeSiO_4$, $Li_2MnSiO_4$, etc., a rock salt layer-type active material in which transition metals are partially substituted with dissimilar metals, such as $LiNi_{0.8}Co_{(0.2-x)}Al_xO_2$ ($0<x<0.2$), a spinel-type active material in which transition metals are partially substituted with dissimilar metals, such as $Li_{1+x}Mn_{2-x-y}M_yO_4$ (M is at least one of Al, Mg, Co, Fe, Ni, and Zn, and $0<x+y<2$), or a lithium titanate such as $Li_4Ti_5O_{12}$.

The sulfide active material may be copper chevrel, iron sulfide, cobalt sulfide, nickel sulfide, or the like.

Each of the first electrode layer 41 and the second electrode layer 42 may be an electrode including an anode active material.

The anode active material is not particularly limited, but may be, for example, a carbon active material or a metal active material.

The carbon active material may be graphite such as mesocarbon microbeads (MCMB) and highly oriented graphite (HOPG) or may be amorphous carbon such as hard carbon and soft carbon.

The metal active material may be In, Al, Si, Sn, or an alloy containing at least one of these elements.

Each of the first electrode layer 41 and the second electrode layer 42 may further include a solid electrolyte, a conductive material, and a binder.

The solid electrolyte may be an oxide solid electrolyte or a sulfide solid electrolyte. However, it is preferable to use a sulfide-based solid electrolyte having high lithium ion conductivity.

The sulfide solid electrolyte is not particularly limited, but examples of the sulfide solid electrolyte may include $Li_2S$—$P_2S_5$, $Li_2S$—$P_2S_5$—$LiI$, $Li_2S$—$P_2S_5$—$LiCl$, $Li_2S$—$P_2S_5$—$LiBr$, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (here, m and n are positive integers, and Z is any one of Ge, Zn, and Ga), $Li_2S$—$GeS_2$, $Li_2S$—$SiS_2$—$Li_3PO_4$, $Li_2S$—$SiS_2$—$Li_xMO_y$ (here, x and y are positive integers, and M is any one of P, Si, Ge, B, Al, Ga, and In), and $Li_{10}GeP_2S_{12}$.

The conductive material plays the role of forming an electron conduction path within the electrode. The conductive material may be an $sp^2$ carbon material such as carbon black, conductive graphite, ethylene black, or carbon nanotube, or may be graphene.

The binder may be butadiene rubber (BR), nitrile butadiene rubber (NBR), hydrogenated nitrile butadiene rubber (HNBR), polyvinylidene difluoride (PVDF), polytetrafluoroethylene (PTFE), carboxymethylcellulose (CMC), or the like.

The solid electrolyte layer 43 plays the role of allowing movement of lithium ions between the first electrode layer 41 and the second electrode layer 42. The solid electrolyte layer 43 may include a first solid electrolyte layer 431 disposed closer to the first electrode layer 41 and a second solid electrolyte layer 432 disposed closer to the second electrode layer 42.

The solid electrolyte layer 43 may include a solid electrolyte, a binder, etc.

The solid electrolyte may be an oxide solid electrolyte or a sulfide solid electrolyte. However, it is preferable to use a sulfide-based solid electrolyte having high lithium ion conductivity.

The sulfide solid electrolyte is not particularly limited, but examples of the sulfide solid electrolyte may include $Li_2S$—$P_2S_5$, $Li_2S$—$P_2S_5$—$LiI$, $Li_2S$—$P_2S_5$—$LiCl$, $Li_2S$—$P_2S_5$—$LiBr$, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (here, m and n are positive integers, and Z is any one of Ge, Zn, and Ga), $Li_2S$—$GeS_2$, $Li_2S$—$SiS_2$—$Li_3PO_4$, $Li_2S$—$SiS_2$—$Li_xMO_y$ (here, x and y are positive integers, and M is any one of P, Si, Ge, B, Al, Ga, and In), and $Li_{10}GeP_2S_{12}$.

The binder may be butadiene rubber (BR), nitrile butadiene rubber (NBR), hydrogenated nitrile butadiene rubber (HNBR), polyvinylidene difluoride (PVDF), polytetrafluoroethylene (PTFE), carboxymethylcellulose (CMC), or the like.

Figure 4:
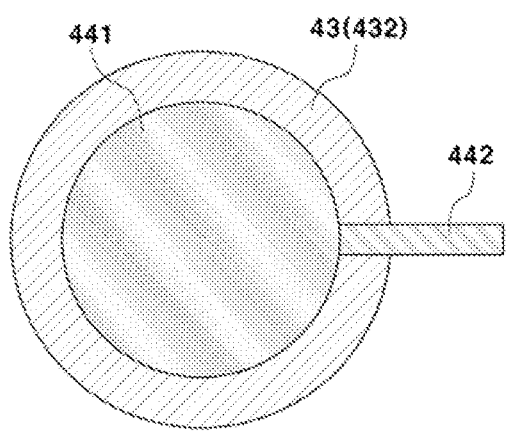
FIG. 4 is a plan view illustrating an SOC control unit and a solid electrolyte layer.

FIG. 4 is a plan view illustrating the SOC control unit 44 and the solid electrolyte layer 43. Specifically, FIG. 4 shows the SOC control unit 44 positioned on the second solid electrolyte layer 432.

Referring to FIG. 4, the SOC control unit 44 includes a flat plate portion 441 and an extension 442. The flat plate portion 441 is positioned between the first solid electrolyte layer 431 and the second solid electrolyte layer 432 and has a predetermined area. The extension 442 is installed such that a first end thereof is connected to the flat plate part 441 and a second end thereof is exposed to the outside through the second cavity 12.

The flat plate portion 441 has a smaller area than that of the solid electrolyte layer 43 so that the first solid electrolyte layer 431 and the second solid electrolyte layer 432 are in contact with each other over an edge of the flat plate portion 441. Therefore, the flat plate portion 441 may not significantly affect the movement of lithium ions through the solid electrolyte layer 43.

The extension 442 is exposed to the outside through the second cavity 12. The extension 442 serve as a current collector and imparts a polarity to the SOC control unit 44.

The SOC control unit 44 includes a metal mesh or metal foam made of at least one selected from the group consisting of tungsten (W), aluminum (Al), nickel (Ni), stainless steel (SUS), and combinations thereof. The metal mesh or metal foam may be coated with at least one noble metal selected from the group consisting of gold (Au), silver (Ag), platinum (Pt), and combinations thereof.

When the all-solid-state battery 40 is a symmetrical cell in which the first electrode layer 41 and the second electrode layer 42 include a cathode active material, the SOC control unit 44 plays the role of accommodating lithium ions migrating from the first electrode layer 41 and the second electrode layer 42. That is, the lithium ions may be deposited and stored on the SOC control unit 44.

When the all-solid-state battery 40 is a symmetrical cell in which the first electrode layer 41 and the second electrode layer 42 include an anode active material, the SOC control unit 44 plays as a lithium source of supplying lithium. In this case, the SOC control unit 44 may undergo pre-lithiation. The pre-lithiation of the SOC control unit 44 is not particularly limited by a specific method. However, preferably, the pre-lithiation may be performed in a manner that lithium is plated or physically coated on the SOC control unit 44 and forms an alloy with the SOC control unit 44.

A method of manufacturing an all-solid-state battery analysis system according to the present disclosure is not particularly limited.

First, after an all-solid-state battery 40 is manufactured, the all-solid-state battery 40 is combined with the body member 10, the first conductive member 20, and the second conductive member 30 to form a system. For example, the second conductive member 30 is first coupled to the body member 10, the all-solid-state battery 40 is then mounted on the second conductive member 30, and the conductive member 10 is then coupled to the body member 10.

Alternatively, the all-solid-state battery 40 may be manufactured during the manufacturing process of the system. In this case, for example, the second conductive member 30 is first coupled to a lower portion of the body member 10, and solid electrolyte powder is put on the second conductive member 30. The second solid electrolyte layer 432 may be manufactured by coupling the first conductive member 10 to an upper portion of the body member 10 and pressing the solid electrolyte powder with the first conductive member 10. The SOC control unit 44 may be installed by inserting the flat plate portion 441 through the first cavity 11 to be mounted on the second solid electrolyte layer 432 and by inserting the extension 442 through the second cavity 12. The first solid electrolyte layer 431 may be formed on the SOC control unit 44 in the same manner as the second solid electrolyte layer 432. Next, the first conductive member 10 is detached, the first electrode layer 41 is arranged on the first solid electrolyte layer 431, the second conductive member 30 is detached, and the second electrode layer 42 is arranged on the second solid electrolyte layer 432. In this way, the system may be manufactured.

Figure 5:
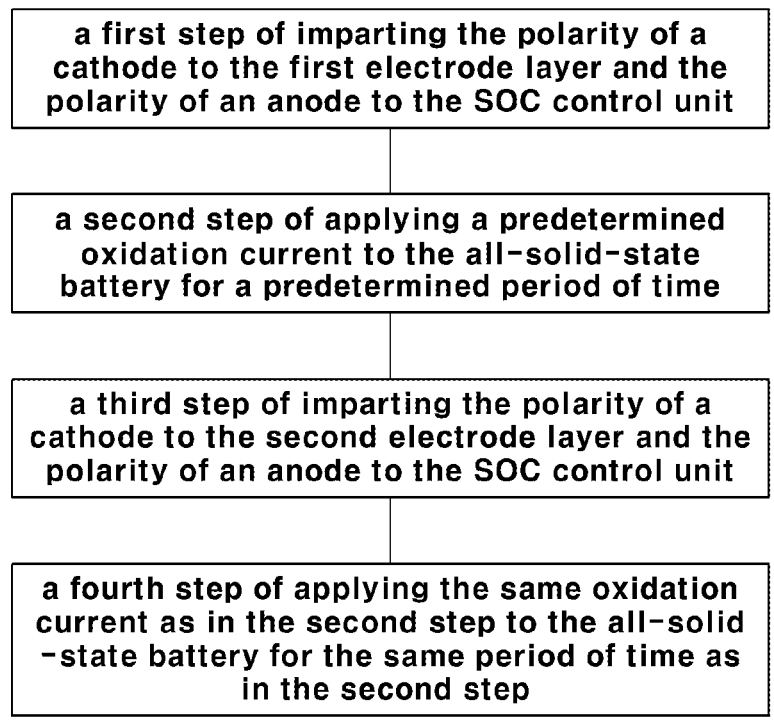
FIG. 5 illustrates an all-solid-state battery analysis method according to a first embodiment of the present disclosure.

FIG. 5 illustrates an all-solid-state battery analysis method according to a first embodiment of the present disclosure. In the first embodiment, an all-solid-state battery 40 may be a symmetrical cell in which a first electrode layer 41 includes a cathode active material and a second electrode layer 42 includes a cathode active material.

The analysis method includes: a first step of imparting the polarity of a cathode to the first electrode layer 41 and the polarity of an anode to the SOC control unit 44; a second step of applying a predetermined oxidation current to the all-solid-state battery 40 for a predetermined period of time; a third step of imparting the polarity of a cathode to the second electrode layer 42 and the polarity of an anode to the SOC control unit 44; and a fourth step of applying the same oxidation current as in the second step to the all-solid-state battery 40 for the same period of time as in the second step.

A method of imparting a polarity to the first electrode layer 41 and the SOC control unit 44 in the first step, and a method of imparting a polarity to the second electrode layer 42 and the SOC control unit 44 in the third step are not particularly limited.

According to the analysis method, it is possible to adjust the state of charge (SOC) of the first electrode layer 41 and the second electrode layer 42 by electro-depositing the lithium of the first electrode layer 41 and the second electrode layer 42 onto the SOC control unit 44. In addition, since the same oxidation current is applied for the same period of time in the second and fourth steps, it is possible to analyze a symmetric cell in which the state of charge (SOC) of the first electrode layer 41 and the state of charge (SOC) of the second electrode layer 42 are adjusted to be equal.

Figure 6A:
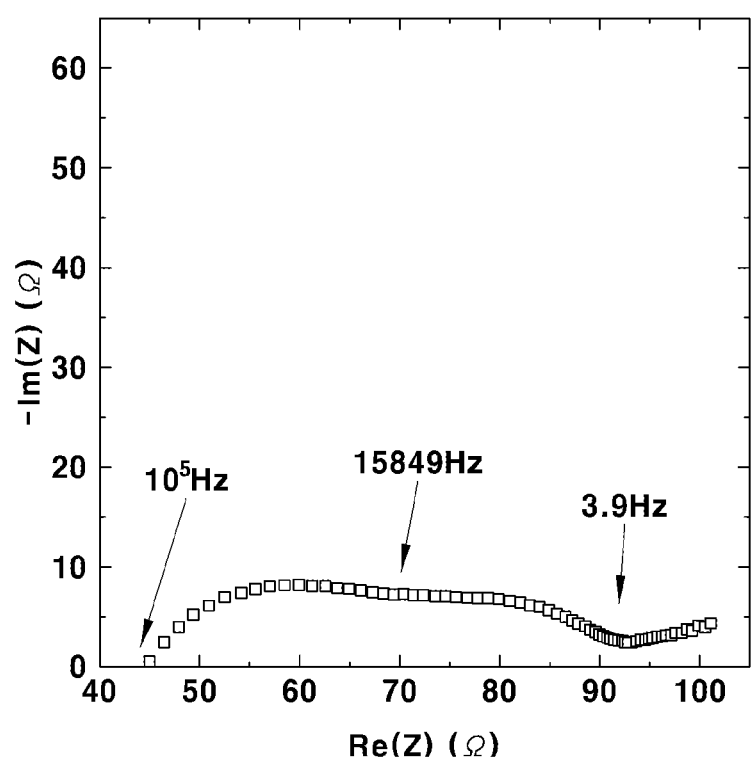
FIG. 6A shows a measurement result for cathode resistance measured by electrochemical impedance spectroscopy while using the all-solid-state battery analysis method according to the first embodiment of the present disclosure.
Figure 6B:
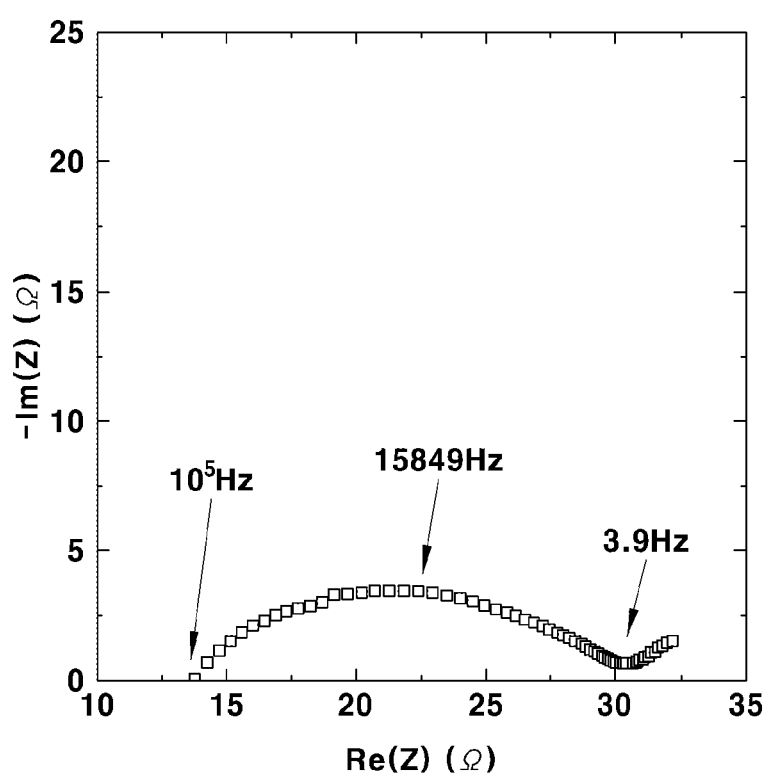
FIG. 6B is a measurement for cathode resistance measured by electrochemical impedance spectroscopy while using a third electrode as a reference electrode in a unit cell including an anode and a cathode, with reference to Korean Patent Application No. 10-2020-0130842.

FIG. 6A shows a measurement result for cathode resistance measured by electrochemical impedance spectroscopy while using the all-solid-state battery analysis method according to the first embodiment of the present disclosure. FIG. 6B shows a measurement result for anode resistance measured by electrochemical impedance spectroscopy using a third electrode as a reference electrode in a unit cell including an anode and a cathode, with reference to Korean Patent Application No. 10-2020-0130842 (hereinafter, referred to as Comparative Example). Referring to FIGS. 6A and 6B, it can be found that the arc separation of the Nyquist plot of the symmetrical cell is clearer in FIG. 6A than in FIG. 6B when the states of charge are equal in both cases.

Figure 7:
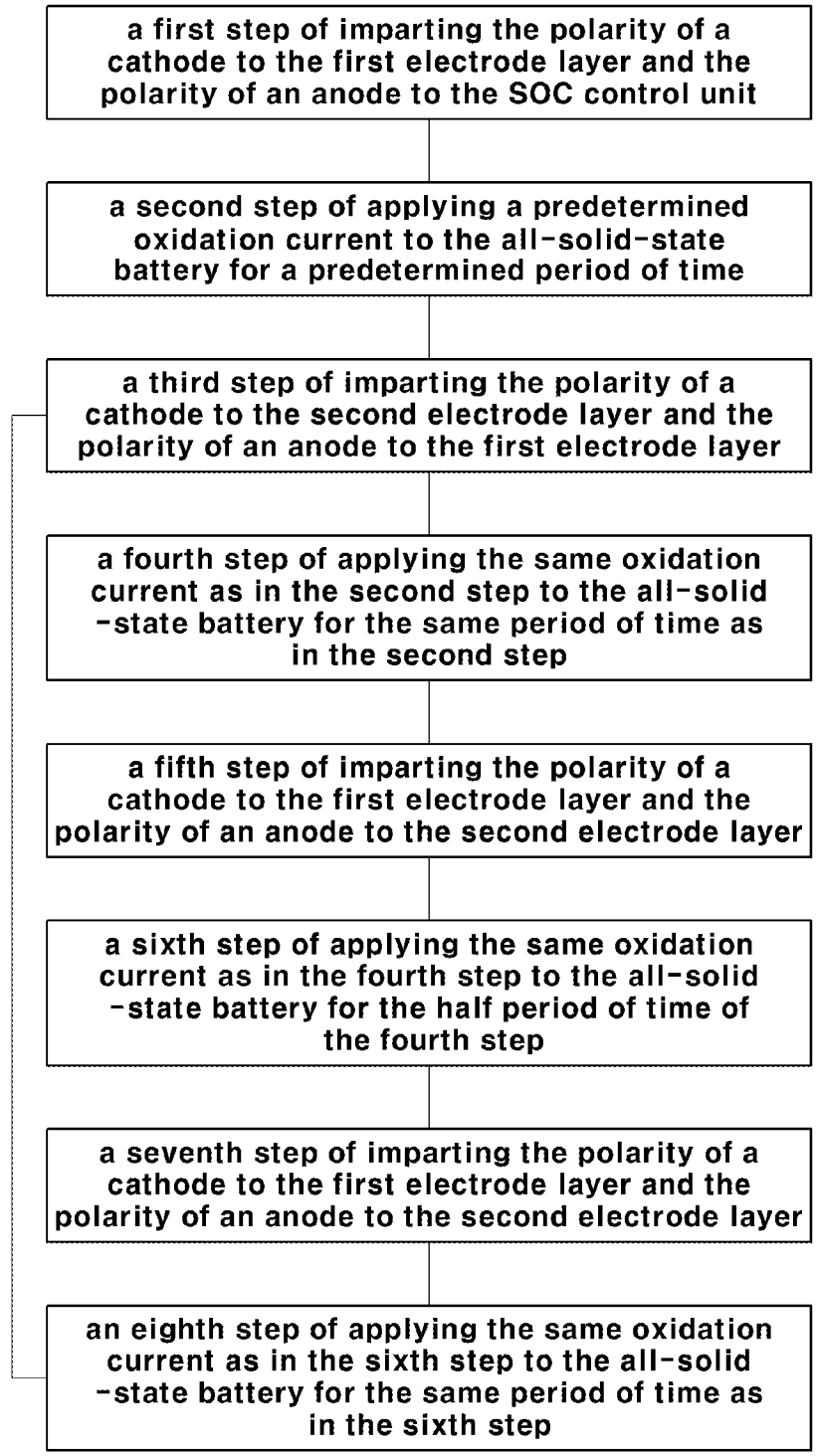
FIG. 7 illustrates an all-solid-state battery analysis method according to a second embodiment of the present disclosure.

FIG. 7 illustrates an all-solid-state battery analysis method according to a second embodiment of the present disclosure. In the second embodiment, an all-solid-state battery 40 may be a symmetrical cell in which a first electrode layer 41 includes a cathode active material and a second electrode layer 42 includes a cathode active material.

The analysis method includes: a first step of imparting the polarity of a cathode to the first electrode layer 41 and the polarity of an anode to the SOC control unit 44; a second step of applying a predetermined oxidation current to the all-solid-state battery 40 for a predetermined period of time; a third step of imparting the polarity of a cathode to the second electrode layer 42 and the polarity of an anode to the first electrode layer 41; a fourth step of applying the same oxidation current as in the second step to the all-solid-state battery 40 for the same period of time as in the second step; a fifth step of imparting the polarity of a cathode to the first electrode layer 41 and the polarity of an anode to the second electrode layer 42; a sixth step of applying the same oxidation current as in the fourth step to the all-solid-state battery 40 for the half period of time of the fourth step; a seventh step of imparting the polarity of a cathode to the first electrode layer 41 and the polarity of an anode to the second electrode layer 42; and an eighth step of applying the same oxidation current as in the sixth step to the all-solid-state battery 40 for the same period of time as in the sixth step. After the eighth step, the third through eighth steps may be repeated a plurality of times until the all-solid-state battery 40 reaches the target state of charge (SOC).

The analysis method oxidizes the lithium of the first electrode layer 41 and electro-deposits lithium on the SOC control unit 44, thereby increasing the state of charge (SOC). In addition, the analysis method oxidizes the lithium in the second electrode layer 42 and reduces the lithium in the first electrode layer 41, thereby reducing the state of charge (SOC) of the first electrode layer 41 and increasing the state of charge (SOC) of the second electrode layer 42. By alternately repeating the processes described above, it is possible to implement a charging and discharging cycle. After charging and discharging are performed, the SOC of the first electrode layer 41 and the SOC of the second electrode layer 42 are adjusted to be equal. In this state, the electrochemical analysis of the all-solid-state battery 40 may be performed. That is, the symmetric cell electrochemical analysis according to the number of cycles can be performed by repeating the charging/discharging cycle and the SOC adjustment.

Figure 8A:
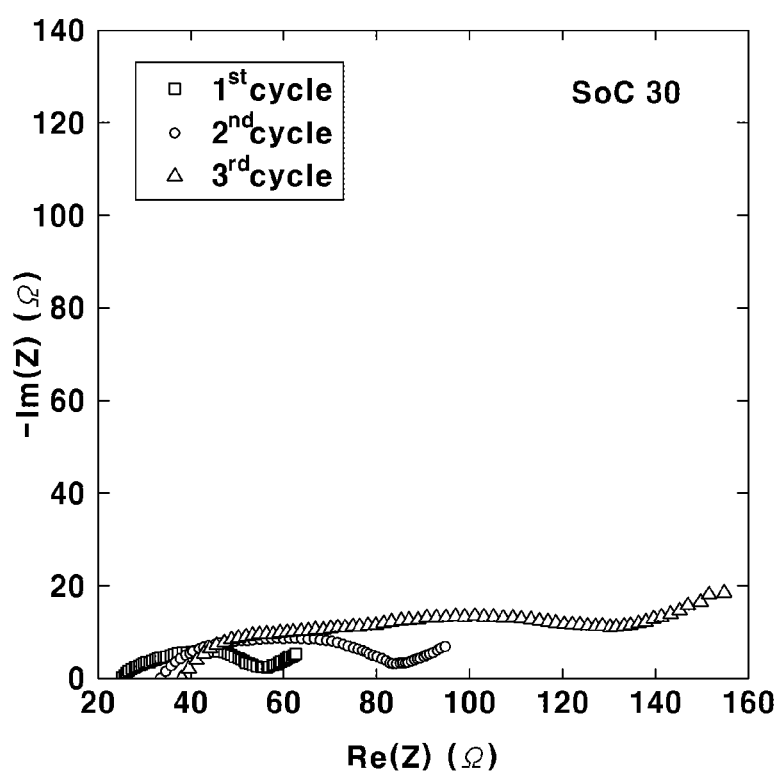
FIG. 8A shows a measurement result for cathode resistance for the case where the state of charge (SOC) is adjusted to 30, the cathode resistance being measured by electrochemical impedance spectroscopy while using the all-solid-state battery analysis method according to the second embodiment of the present disclosure.
Figure 8B:
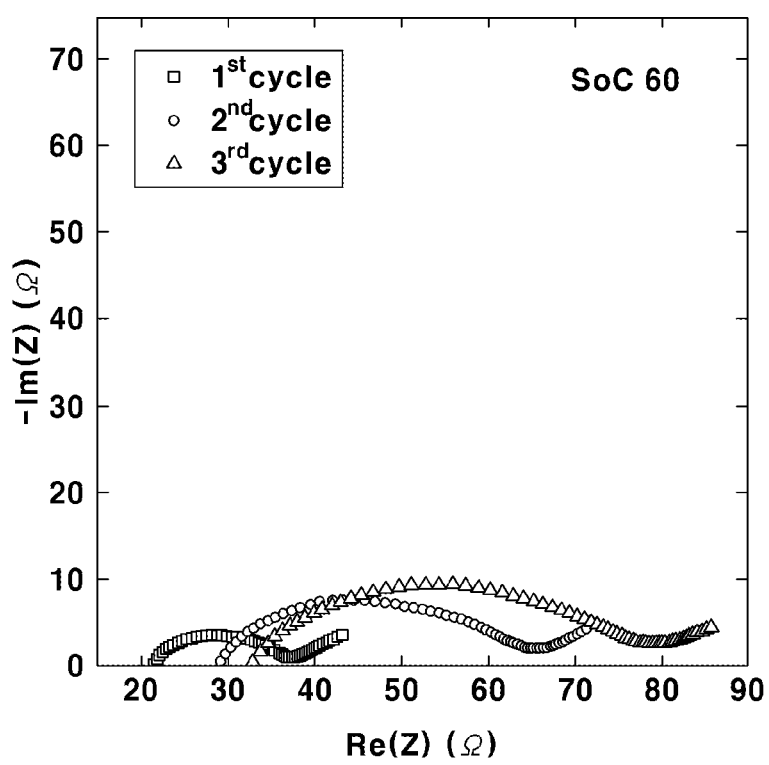
FIG. 8B shows a measurement result for cathode resistance for the case where the SOC is adjusted to 60, the cathode resistance being measured by electrochemical impedance spectroscopy while using the all-solid-state battery analysis method according to the second embodiment of the present disclosure.

FIG. 8A shows a measurement result for cathode resistance for the case where the state of charge (SOC) is adjusted to 30, the cathode resistance being measured by electrochemical impedance spectroscopy while using the all-solid-state battery analysis method according to the second embodiment of the present disclosure. FIG. 8B shows a measurement result for cathode resistance for the case where the SOC is adjusted to 60, the cathode resistance being measured by electrochemical impedance spectroscopy while using the all-solid-state battery analysis method according to the second embodiment of the present disclosure; Comparing FIGS. 8A and 8B, there is a clear difference in resistance according to the state of charge (SOC). In addition, an increase in resistance attributable to performance deterioration caused by repeated charging and discharging cycles at the same SOC can be distinguished. Therefore, according to the present disclosure, it is possible to analyze the resistance changing with the state of charge (SOC) and the resistance changing with the number of charging and discharging cycles.

Figure 9:
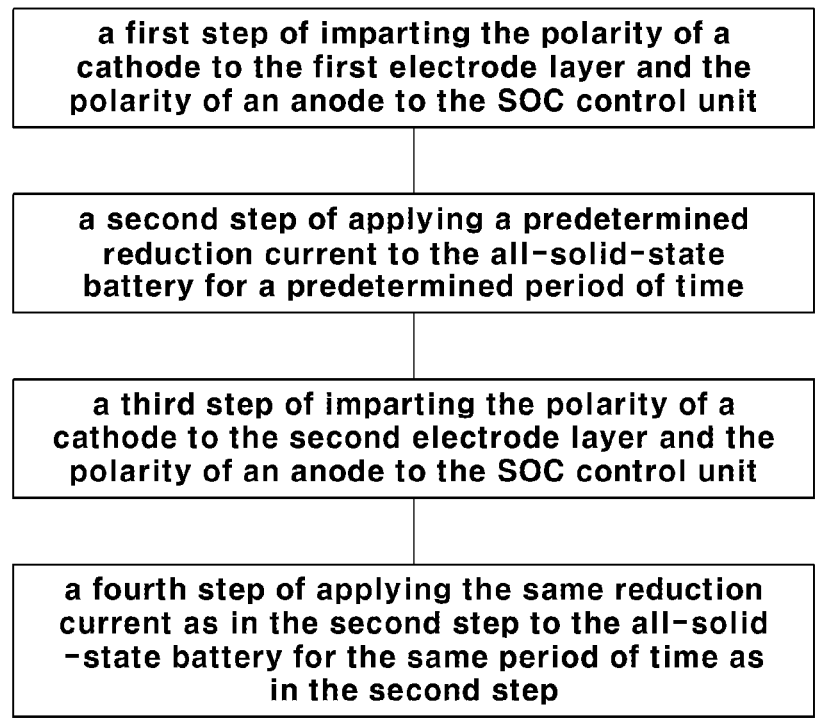
FIG. 9 illustrates an all-solid-state battery analysis method according to a third embodiment of the present disclosure.

FIG. 9 illustrates an all-solid-state battery analysis method according to a third embodiment of the present disclosure. In the third embodiment, an all-solid-state battery 40 may be a symmetrical cell in which a first electrode layer 41 includes an anode active material and a second electrode layer 42 includes an anode active material. An SOC control unit 44 of the all-solid-state battery 40 is formed by lithium plating.

The analysis method includes: a first step of imparting the polarity of a cathode to the first electrode layer 41 and the polarity of an anode to the SOC control unit 44; a second step of applying a predetermined reduction current to the all-solid-state battery 40 for a predetermined period of time; a third step of imparting the polarity of a cathode to the second electrode layer 42 and the polarity of an anode to the SOC control unit 44; a fourth step of applying the same reduction current as in the second step to the all-solid-state battery 40 for the same period of time as in the second step.

According to the analysis method, it is possible to adjust the state of charge (SOC) by causing the lithium of the SOC control unit 44 to be reduced on the first electrode layer 41 and the second electrode layer 42. In addition, since the same reduction current is applied for the same period of time in the second and fourth steps, it is possible to analyze a symmetric cell in which the state of charge (SOC) of the first electrode layer 41 and the state of charge (SOC) of the second electrode layer 42 are adjusted to be equal.

Figure 10A:
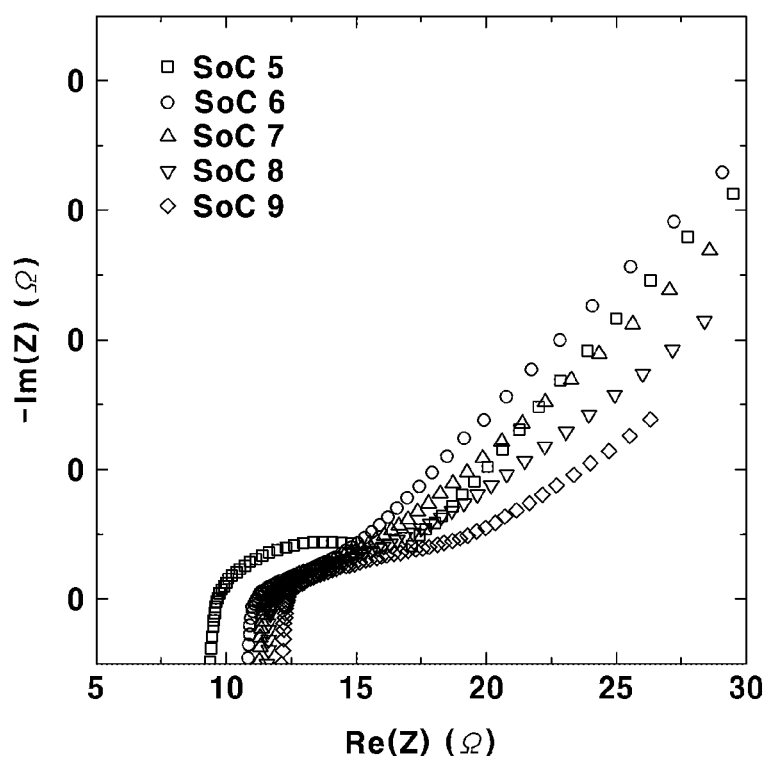
FIG. 10A shows a measurement result for anode resistance measured by electrochemical impedance spectroscopy while using an all-solid-state battery analysis method according to the third embodiment of the present disclosure.
Figure 10B:
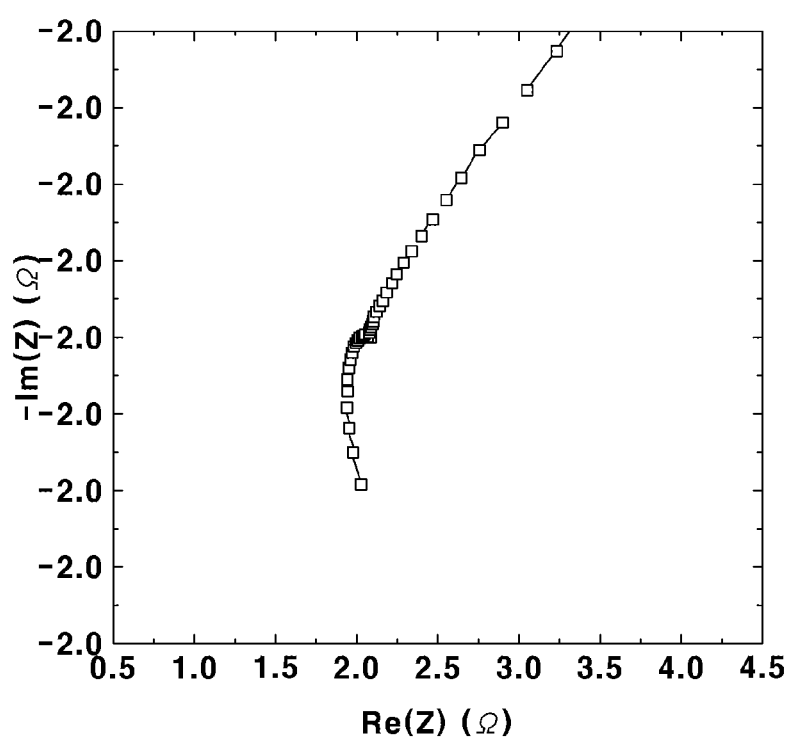
FIG. 10B is a measurement result for anode resistance measured by electrochemical impedance spectroscopy while using a third electrode as a reference electrode in a unit cell including an anode and a cathode, with reference to Korean Patent Application No. 10-2020-0130842.

FIG. 10A shows a measurement result for anode resistance measured by electrochemical impedance spectroscopy while using the all-solid-state battery analysis method according to the third embodiment of the present disclosure. FIG. 10B is a measurement result for anode resistance measured by electrochemical impedance spectroscopy while using a third electrode as a reference electrode in a unit cell including an anode and a cathode, using Comparative Example. Comparing FIGS. 10A and 10B, it can be seen that a stable signal can be obtained according to the analysis method of the present disclosure. Referring to FIG. 10B, since the symmetry of the state of charge (SOC) is not satisfied, an unstable signal is generated in the vicinity of the real impedance intercept in a high frequency region in the Nyquist plot.

Figure 11:
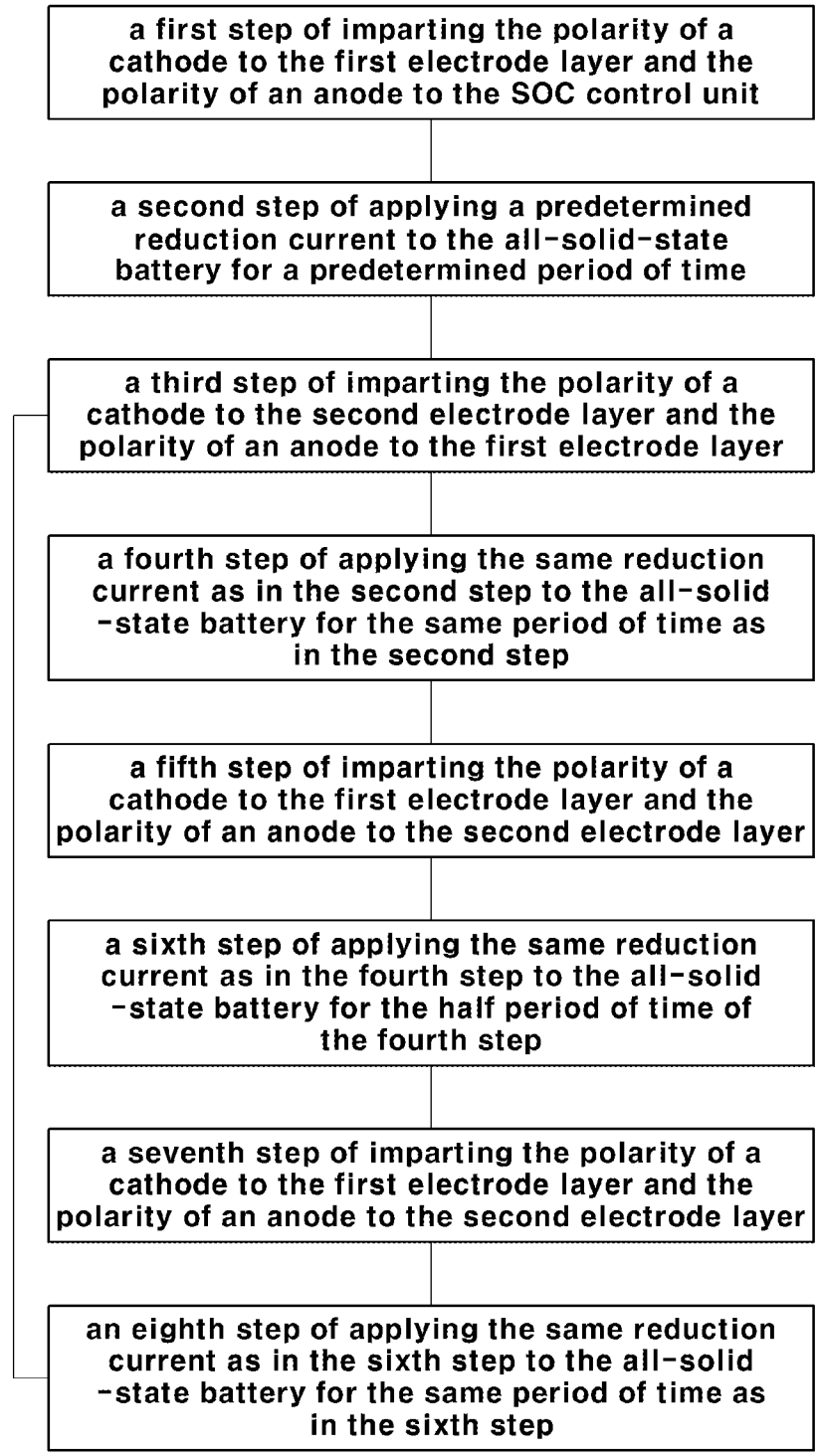
FIG. 11 illustrates an all-solid-state battery analysis method according to a fourth embodiment of the present disclosure.

FIG. 11 illustrates an all-solid-state battery analysis method according to a fourth embodiment of the present disclosure. In the fourth embodiment, an all-solid-state battery 40 may be a symmetrical cell in which a first electrode layer 41 includes an anode active material and a second electrode layer 42 includes an anode active material. An SOC control unit 44 of the all-solid-state battery 40 is formed by lithium plating.

The analysis method includes: a first step of imparting the polarity of a cathode to the first electrode layer 41 and the polarity of an anode to the SOC control unit 44; a second step of applying a predetermined reduction current to the all-solid-state battery 40 for a predetermined period of time; a third step of imparting the polarity of a cathode to the second electrode layer 42 and the polarity of an anode to the first electrode layer 41; a fourth step of applying the same reduction current as in the second step to the all-solid-state battery 40 for the same period of time as in the second step; a fifth step of imparting the polarity of a cathode to the first electrode layer 41 and the polarity of an anode to the second electrode layer 42; a sixth step of applying the same reduction current as in the fourth step to the all-solid-state battery 40 for the half period of time of the fourth step; a seventh step of imparting the polarity of a cathode to the first electrode layer 41 and the polarity of an anode to the second electrode layer 42; and an eighth step of applying the same reduction current as in the sixth step to the all-solid-state battery 40 for the same period of time as in the sixth step. After the eighth step, the third through eighth steps may be repeated a plurality of times until the all-solid-state battery 40 reaches the target state of charge (SOC).

This analysis method reduces the lithium of the first electrode layer 41 in the first electrode layer 41 to increase the state of charge (SOC). In addition, the analysis method reduces the lithium which is reduced in the first electrode layer 41, in the second electrode layer 42, thereby reducing the state of charge (SOC) of the first electrode layer 41 and increasing the state of charge (SOC) of the second electrode layer 42. By alternately repeating the processes described above, it is possible to implement a charging and discharging cycle. After charging and discharging are performed, the SOC of the first electrode layer 41 and the SOC of the second electrode layer 42 are adjusted to be equal. In this state, the electrochemical analysis of the all-solid-state battery 40 may be performed. That is, the symmetric cell electrochemical analysis according to the number of cycles can be performed by repeating the charging/discharging cycle and the SOC adjustment.

Figure 12A:
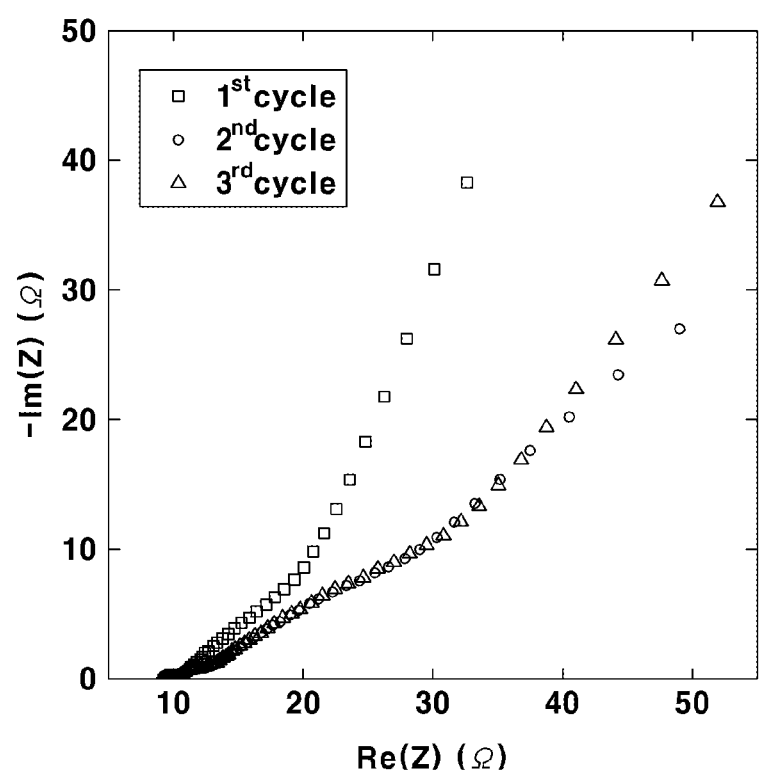
FIG. 12A shows a measurement result for anode resistance measured by electrochemical impedance spectroscopy while using the all-solid-state battery analysis method according to the fourth embodiment of the present disclosure.
Figure 12B:
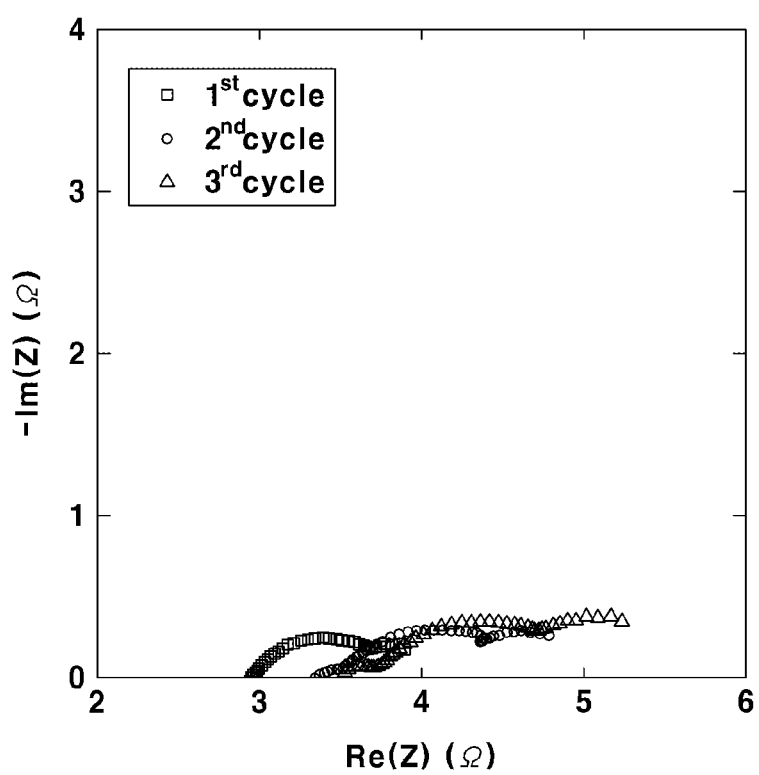
FIG. 12B is an impedance measurement result of an anode half cell prepared according to the disclosure of Korean Patent Application No. 10-2020-0130842.

FIG. 12A shows a measurement result for anode resistance measured by electrochemical impedance spectroscopy while using the all-solid-state battery analysis method according to the fourth embodiment of the present disclosure. FIG. 12B is an impedance measurement result of an anode half cell prepared according to Comparative Example. Referring to FIG. 12A. it can be seen that a stable signal can be obtained according to the analysis method of the present disclosure. On the other hand, referring to FIG. 12B, it is difficult to determine an accurate signal of only the anode because the electrochemical signal of lithium of the counter electrode is mixed.

While exemplary embodiments of the present disclosure have been described with reference to the accompanying drawings, those skilled in the art will appreciate that the present disclosure can be implemented in other different forms without departing from the technical spirit or essential characteristics of the exemplary embodiments. Therefore, it can be understood that the exemplary embodiments described above are only for illustrative purposes and are not restrictive in all aspects.

What is claimed is:

1. A system for analysis of an all-solid-state battery, the system comprising:
a body member, of cylindrical shape, having a first cavity extending therethrough in a vertical direction and a second cavity extending therethrough in a horizontal direction and communicating with the first cavity;
a first conductive member including a first base having a plate shape and a first protrusion protruding from the first base having a shape corresponding to a shape of the first cavity; and
a second conductive member including a second base having a plate shape and a second protrusion protruding from the second base and having a shape corresponding to the shape of the first cavity,
wherein the first conductive member is configured such that the first protrusion is configured to be inserted into the first cavity from above the body member and the second conductive member is configured such that the second protrusion is configured to be inserted into the first cavity from below the body member,
wherein a gap between the first protrusion and the second protrusion in the first cavity is configured to receive an all-solid-state battery positioned therein, and
wherein the all-solid-state battery comprises: a first electrode layer in contact with the first protrusion, a second electrode layer in contact with the second protrusion, a solid electrolyte layer positioned between the first electrode layer and the second electrode layer, and an SOC control unit having a first end disposed in the solid electrolyte layer and a second end exposed to an outside through the second cavity.

2. The system according to claim 1, further comprising an insulating portion disposed on an inner wall of the first cavity and an inner wall of the second cavity.

3. The system according to claim 1, wherein the solid electrolyte layer comprises a first solid electrolyte layer adjacent the first electrode layer and a second solid electrolyte layer adjacent the second electrode layer, and
the SOC control unit comprises:
a flat plate portion having a predetermined area and being disposed between the first solid electrolyte layer and the second solid electrolyte layer; and
an extension portion having a first end connected to the flat plate portion and a second end that is exposed via the second cavity.

4. The system according to claim 3, wherein the flat plate portion has a smaller area than that of the solid electrolyte layer such that the first solid electrolyte layer and the second solid electrolyte layer are in contact with each other over an edge of the flat plate portion.

5. The system according to claim 1, wherein the SOC control unit comprises a metal mesh and/or metal foam including at least one metallic material selected from the group comprising tungsten (W), aluminum (Al), nickel (Ni), stainless steel (SUS), and combinations thereof.

6. The system according to claim 1, wherein the SOC control unit is coated with at least one noble metal selected from the group comprising gold (Au), silver (Ag), platinum (Pt), and combinations thereof.

7. The system according to claim 1, wherein the SOC control unit is pre-lithiated.

8. A method of analyzing an all-solid-state battery using the system of claim 1, the method comprising:

a first step of imparting the polarity of the cathode to the first electrode layer and the polarity of the anode to the SOC control unit;

a second step of applying a predetermined oxidation current to the all-solid-state battery for a predetermined period of time;

a third step of imparting the polarity of the cathode to the second electrode layer and the polarity of the anode to the SOC control unit; and a fourth step of applying the same oxidation current as in the second step to the all-solid-state battery for the same period of time as in the second step, wherein the all-solid-state battery comprises a symmetric cell in which the first electrode layer comprises a cathode active material and the second electrode layer comprises a cathode active material.

9. A method of analyzing an all-solid-state battery using the system of claim 1, the method comprising:

a first step of imparting the polarity of the cathode to the first electrode layer and the polarity of the anode to the SOC control unit;

a second step of applying a predetermined oxidation current to the all-solid-state battery for a predetermined period of time;

a third step of imparting the polarity of the cathode to the second electrode layer and the polarity of the anode to the first electrode layer;

a fourth step of applying the same oxidation current as in the second step to the all-solid-state battery for the same period of time as in the second step;

a fifth step of imparting the polarity of the cathode to the first electrode layer and the polarity of the anode to the second electrode layer;

a sixth step of applying the same oxidation current as in the fourth step to the all-solid-state battery for half the period of time of the fourth step;

a seventh step of imparting the polarity of the cathode to the first electrode layer and the polarity of the anode to the second electrode layer; and an eighth step of applying the same oxidation current as in the sixth step to the all-solid-state battery for the same period of time as in the sixth step, wherein after the eighth step, the third through eighth steps are performed a plurality of times until the all-solid-state battery reaches a target SOC, wherein the all-solid-state battery comprises a symmetric cell in which the first electrode layer comprises a cathode active material and the second electrode layer comprises a cathode active material.

10. A method of analyzing an all-solid-state battery using the system of claim 1, the method comprising:

a first step of imparting the polarity of the cathode to the first electrode layer and the polarity of the anode to the SOC control unit;

a second step of applying a predetermined reduction current to the all-solid-state battery for a predetermined period of time;

a third step of imparting the polarity of the cathode to the second electrode layer and the polarity of the anode to the SOC control unit; and a fourth step of applying the same reduction current as in the second step to the all-solid-state battery for the same period of time as in the second step, wherein the all-solid-state battery comprises a symmetric cell in which the first electrode layer comprises an anode active material and the second electrode layer comprises an anode active material.

11. A method of analyzing an all-solid-state battery using the system of claim 1, the method comprising:

a first step of imparting the polarity of the cathode to the first electrode layer and the polarity of the anode to the SOC control unit;

a second step of applying a predetermined reduction current to the all-solid-state battery for a predetermined period of time;

a third step of imparting the polarity of the cathode to the second electrode layer and the polarity of the anode to the first electrode layer;

a fourth step of applying the same reduction current as in the second step to the all-solid-state battery for the same period of time as in the second step;

a fifth step of imparting the polarity of the cathode to the first electrode layer and the polarity of the anode to the second electrode layer;

a sixth step of applying the same reduction current as in the fourth step to the all-solid-state battery for half the period of time of the fourth step;

a seventh step of imparting the polarity of the cathode to the first electrode layer and the polarity of the anode to the second electrode layer; and an eighth step of applying the same reduction current as in the sixth step to the all-solid-state battery for the same period of time as in the sixth step, wherein after the eighth step, the third through eighth steps are performed a plurality of times until the all-solid-state battery reaches a target SOC, wherein the all-solid-state battery comprises a symmetric cell in which the first electrode layer comprises an anode active material and the second electrode layer comprises an anode active material.

* * * * *